US012577443B2

(12) United States Patent
Lee et al.

(10) Patent No.: US 12,577,443 B2

(45) Date of Patent: Mar. 17, 2026

(54) ADHESIVE FILM, OPTICAL MEMBER COMPRISING THE SAME, AND OPTICAL DISPLAY APPARATUS COMPRISING THE SAME

(71) Applicant: SAMSUNG SDI CO., LTD., Yongin-si (KR)

(72) Inventors: Jung Hyo Lee, Suwon-si (KR); Won Kim, Suwon-si (KR); Oh Hyeon Hwang, Suwon-si (KR); Irina Nam, Suwon-si (KR); Il Jin Kim, Suwon-si (KR); Dong Heon Yun, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/701,462

(22) Filed: Mar. 22, 2022

(65) Prior Publication Data

US 2022/0306910 A1 Sep. 29, 2022

(30) Foreign Application Priority Data

Mar. 23, 2021 (KR) ........................ 10-2021-0037616

(51) Int. Cl.

| | |
|---|---|
| ***C09J 133/08*** | (2006.01) |
| ***C08K 3/24*** | (2006.01) |
| ***C08K 5/00*** | (2006.01) |
| ***C08K 5/105*** | (2006.01) |
| ***C08K 5/132*** | (2006.01) |

(Continued)

(52) U.S. Cl.

CPC ............... *C09J 133/08* (2013.01); *C08K 3/24* (2013.01); *C08K 5/0025* (2013.01); *C08K 5/105* (2013.01); *C08K 5/132* (2013.01); *C08K 5/29* (2013.01); *C08L 33/08* (2013.01); *C09J 4/06* (2013.01); *C09J 7/40* (2018.01); *C09J 133/066* (2013.01); *C08L 2205/025* (2013.01);

(Continued)

(58) Field of Classification Search

None

See application file for complete search history.

(56) References Cited

U.S. PATENT DOCUMENTS

| | | |
|---|---|---|
| 5,814,685 A | 9/1998 | Satake et al. |
| 7,070,051 B2 | 7/2006 | Kanner et al. |

(Continued)

FOREIGN PATENT DOCUMENTS

| | | |
|---|---|---|
| CN | 107418481 A | 12/2017 |
| CN | 110072959 A | 7/2019 |

(Continued)

OTHER PUBLICATIONS

JP-2019065113 English Machine Translation.*

(Continued)

*Primary Examiner* — Frank D Ducheneaux

(74) *Attorney, Agent, or Firm* — Womble Bond Dickinson (US) LLP

(57) ABSTRACT

An adhesive film, an optical member including the same, and an optical display apparatus including the same are provided. An adhesive film is formed of an adhesive composition including a (meth)acrylic copolymer, a curing agent, a mono- or higher functional monomer, a binder having a melting point of about 30° C. to about 60° C., and an initiator, and has a peel strength increase rate of 7.0 or more, as calculated according to Equation 1 herein.

19 Claims, 2 Drawing Sheets

(51) Int. Cl.

| | |
|---|---|
| ***C08K 5/29*** | (2006.01) |
| ***C08L 33/08*** | (2006.01) |
| ***C09J 4/06*** | (2006.01) |
| ***C09J 7/40*** | (2018.01) |
| ***C09J 133/06*** | (2006.01) |

(52) U.S. Cl.

CPC .... *C09J 2203/318* (2013.01); *C09J 2301/312* (2020.08); *C09J 2433/00* (2013.01)

(56) References Cited

U.S. PATENT DOCUMENTS

| | | | |
|---|---|---|---|
| 7,341,821 | B2 | 3/2008 | Sonokawa |
| 9,816,685 | B2 | 11/2017 | Kim et al. |
| 2014/0158300 | A1 | 6/2014 | Hayata et al. |
| 2014/0205827 | A1 | 7/2014 | Mun et al. |
| 2016/0115355 | A1 | 4/2016 | Kim et al. |
| 2017/0166786 | A1 | 6/2017 | Moon et al. |
| 2019/0086841 | A1 | 3/2019 | Honya et al. |
| 2020/0347269 | A1 | 11/2020 | Kim et al. |
| 2021/0087435 | A1 | 3/2021 | Kang et al. |

FOREIGN PATENT DOCUMENTS

| | | | | | |
|---|---|---|---|---|---|
| CN | 110713804 | A | | 1/2020 | |
| CN | 111094483 | A | | 5/2020 | |
| CN | 111133070 | A | | 5/2020 | |
| CN | 111770975 | A | | 10/2020 | |
| EP | 3750965 | A1 | * | 12/2020 | ............. B32B 27/08 |
| JP | 2005-317523 | A | | 11/2005 | |
| JP | 2012-184322 | A | | 9/2012 | |
| JP | 2014-32270 | A | | 2/2014 | |
| JP | 5683369 | B | | 3/2015 | |
| JP | 2019-65113 | A | | 4/2019 | |
| JP | 2019065113 | A | * | 4/2019 | ............. C09J 11/06 |
| JP | 2020-132658 | A | | 8/2020 | |
| JP | 2020-186330 | A | | 11/2020 | |
| KR | 2020-0012451 | A | | 2/2020 | |
| KR | 2020-0062255 | A | | 6/2020 | |
| KR | 2024039838 | A | * | 3/2024 | ............. C08G 77/20 |
| WO | WO 2017/171084 | A | | 10/2017 | |
| WO | WO 2020/022859 | A1 | | 1/2020 | |

OTHER PUBLICATIONS

Machine translation of KR-2024039838-A (Year: 2024).*
Machine translation of JP 2005317523 A (Year: 2015).*
Korean Office Action dated May 4, 2023, issued in corresponding Korean Patent Application No. 10-2021-0037616 (6 pages).
Chinese Office Action dated Jul. 17, 2023 issued in corresponding Chinese Patent Application No. 202210289639.0 (7 pages).
Aldrich Data Sheet (Year: 2019).
"Butylacrylate", Arkeman, https://www.arkema.com/usa/en/product/acrylics/butylacrylate/#:-:text=Butylacrylate%20is%20a%20colorless%20liquid,C%20(%2D65%C2%B0F), accessed Oct. 4, 2023.
JP 2012-184322 English Machine Translation.
Machine translation of JP 2014032270 A (Year: 2014).
Japanese Office Action dated Jan. 24, 2023 issued in Japanese Patent Application No. 2022-047093 (5 pages).
Korean Office Action dated May 4, 2023, issued in Korean Patent Application No. 10-2021-0037615 (7 pages).
Chinese Office Action dated Jul. 21, 2023, issued in Chinese Patent Application No. 202210289636.7 (7 pages).
US Final Office Action dated Apr. 9, 2024, issued in U.S. Appl. No. 17/701,515 (15 pages).
Chinese Office Action dated Jun. 5, 2023, issued in Chinese Patent Application No. 202210290613.8 (6 pages).
US Office Action dated Oct. 19, 2023, issued in U.S. Appl. No. 17/701,456 (16 pages).
US Office Action dated Sep. 28, 2023, issued in U.S. Appl. No. 17/701,515 (15 pages).
Machine translation of JP 2019065113 A (Year: 2019).
US Final Office Action dated Jun. 18, 2024, issued in U.S. Appl. No. 17/701,456 (16 pages).
US Office Action dated Feb. 7, 2025, issued in U.S. Appl. No. 17/701,515 (15 pages).
https://pubchem.ncbi.nlm.nih.gov/compound/2-Phenoxyethyl-acrylate (Year: 2025), cited by the Examiner in the US Office Action dated Feb. 7, 2025 that issued in U.S. Appl. No. 17/701,515.
https://pubchem.ncbi.nlm.nih.gov/compound/Nonylphenol-ethylene-oxide (Year: 2025), cited by the Examiner in the US Office Action dated Feb. 7, 2025 that issued in U.S. Appl. No. 17/701,515.
https://www.sigmaaldrich.com/US/en/product/aldrich/408336?srsltid=AfmBOoqjKSnf- 6_iBzp2TegbFOiHz8NtJqAJkZiX2PO-E6Taw4hPIC1q (Year: 2025), cited by the Examiner in the US Office Action dated Feb. 7, 2025 that issued in U.S. Appl. No. 17/701,515.
US Office Action dated Feb. 11, 2025, issued in U.S. Appl. No. 17/701,456 (16 pages).
Data Sheet for Aronix M-101A (Year: 2025).
US Final Office Action dated May 19, 2025, issued in U.S. Appl. No. 17/701,515 (17 pages).
US Office Action dated May 22, 2025, issued in U.S. Appl. No. 17/701,456 (10 pages).
US Office Action dated Aug. 27, 2025, issued in U.S. Appl. No. 17/701,515 (17 pages).

* cited by examiner

ADHESIVE FILM, OPTICAL MEMBER COMPRISING THE SAME, AND OPTICAL DISPLAY APPARATUS COMPRISING THE SAME

CROSS-REFERENCE TO RELATED APPLICATION

This application claims priority to and the benefit of Korean Patent Application No. 10-2021-0037616, filed on Mar. 23, 2021 in the Korean Intellectual Property Office, the entire disclosure of which is incorporated herein by reference.

BACKGROUND

1. Field

Aspects of embodiments of the present invention relate to an adhesive film, an optical member including the same, and an optical display apparatus including the same.

2. Description of the Related Art

In recent years, optical displays using organic light emitting diodes (OLED) have been developed. In particular, an optical display based on flexible organic light emitting diodes has been spotlighted in the art.

A flexible panel based on flexible organic light emitting diodes includes a plastic film, such as a polyimide film and the like, on each of upper and lower sides of the panel. The flexible panel is more flexible than a liquid crystal panel and a typical organic light emitting diode-based panel. Accordingly, a protective film for processes is temporarily adhered to the flexible panel to protect the flexible panel or to prevent or substantially prevent occurrence of scratches on the flexible panel during a process of processing, assembling, and/or inspecting the flexible panel. When it is determined through inspection of the flexible panel that there is a defect, such as abnormal appearance or foreign matter, it is desirable for the protective film to have low peel strength in order to be easily removed from the flexible panel. After inspection of the flexible panel, a protective film for reinforcement is adhered to the flexible panel to support the panel while protecting the panel from external environments. Therefore, the protective film for reinforcement is desired to have higher peel strength and reliability than the protective film for processes.

However, in a typical panel manufacturing process, a process of assembling a temporary protective film for processes to a panel, a process of peeling off the temporary protective film of the panel, and a process of assembling a protective film for reinforcement to the panel must be sequentially performed, thereby complicating the manufacturing process. Moreover, since the protective film for processes must be discarded after the peeling process, there is a problem of deterioration in economic efficiency and environmental friendliness.

The background technique of the present invention is disclosed in JP Patent Registration No. 5,683,369 and the like.

SUMMARY

According to an aspect of one or more embodiments of the present invention, an adhesive film is provided that can be easily removed from an adherend after attachment of the adhesive film thereto and can be secured to the adherend through a process (e.g., a predetermined process).

According to another aspect of one or more embodiments of the present invention, an adhesive film is provided that can be adhered at low peel strength to an adherend to provide temporary protection to the adherend in an initial stage and can be easily removed therefrom without deformation and/or damage to the adherend through selective cutting of an unnecessary portion of the adhesive film.

According to another aspect of one or more embodiments of the present invention, a protective adhesive film is provided that exhibits significant increase in peel strength after irradiation with light and heat treatment, as compared with peel strength before irradiation with light, and is secured to an adherend to improve durability of an optical member including the adherend.

According to another aspect of one or more embodiments of the present invention, an adhesive film is provided that can be concurrently (e.g., simultaneously) used as a temporary protective film for processes with respect to a flexible panel substrate and as a protective film for reinforcement of patterns, which is selectively partially peeled off to form patterns.

According to an aspect of one or more embodiments of the present invention, an adhesive film is provided.

According to one or more embodiments, an adhesive film is formed of an adhesive composition including a (meth) acrylic copolymer, a curing agent, a mono- or higher functional monomer, a binder having a melting point of about 30° C. to about 60° C., and an initiator, and has a peel strength increase rate of 7.0 or more, as calculated by the following Equation 1:

$$\text{Peel strength increase rate} = P2/P1,$$

where P1 is an initial peel strength (unit: gf/inch) of the adhesive film with respect to an adherend, as measured on a specimen of the adhesive film and the adherend, and P2 is a peel strength of the adhesive film (unit: gf/inch) with respect to the adherend, as measured on the specimen of the adhesive film and the adherend after irradiation with light and heat treatment of the specimen.

According to one or more embodiments, an adhesive film is formed of an adhesive composition including a (meth) acrylic copolymer, a curing agent, a mono- or higher functional monomer, a binder having a melting point of about 30° C. to about 60° C., and an initiator, and has an initial peel strength of greater than 0 gf/inch to about 100 gf/inch with respect to an adherend, as measured on a specimen of the adhesive film and the adherend, and a peel strength of 500 gf/inch or more with respect to the adherend, as measured on the specimen of the adhesive film and the adherend after irradiation and heat treatment of the specimen.

In one or more embodiments, P1 may be greater than 0 gf/inch and less than or equal to about 100 gf/inch.

In one or more embodiments, P2 may be about 500 gf/inch or more.

In one or more embodiments, the mono- or higher functional monomer may have a higher glass transition temperature in a homopolymer phase than the (meth)acrylic copolymer.

In one or more embodiments, a difference in glass transition temperature between the mono- or higher functional monomer in a homopolymer phase and the (meth)acrylic copolymer may be about 20° C. or more.

In one or more embodiments, the mono- or higher functional monomer may have a glass transition temperature of about −30° C. or more in a homopolymer phase.

In one or more embodiments, the mono- or higher functional monomer may include an aromatic group-containing mono- or higher functional monomer.

In one or more embodiments, the aromatic group-containing mono- or higher functional monomer may include a compound of the following Formula 1:

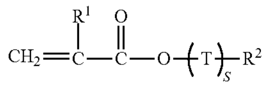

where $R^1$ is hydrogen or a methyl group; s is an integer of 0 to 10; $R^2$ is a substituted or unsubstituted $C_6$ to $C_{50}$ aryl group or a substituted or unsubstituted $C_6$ to $C_{50}$ aryloxy group; and T is a substituted or unsubstituted $C_1$ to $C_6$ alkylene group or a substituted or unsubstituted $C_1$ to $C_6$ alkyleneoxy group.

In one or more embodiments, the mono- or higher functional monomer may be present in an amount of about 10 parts by weight to about 200 parts by weight relative to 100 parts by weight of the (meth)acrylic copolymer.

In one or more embodiments, the (meth)acrylic copolymer may have a glass transition temperature of about −10° C. or less.

In one or more embodiments, the (meth)acrylic copolymer may include a copolymer of a monomer mixture including an alkyl group-containing (meth)acrylic monomer and a hydroxyl group-containing (meth)acrylic monomer, and the hydroxyl group-containing (meth)acrylic monomer may be present in an amount of about 0.1 mol % to about 10 mol % in the monomer mixture.

In one or more embodiments, the curing agent may include a mixture of an isocyanate curing agent and a metal chelate curing agent.

In one or more embodiments, the binder having a melting point of about 30° C. to about 60° C. may include a binder of a monomer mixture including a (meth)acrylate having a linear or branched $C_{16}$ to $C_{22}$ alkyl group at an ester site.

In one or more embodiments, the monomer mixture may further include at least one selected from among a (meth) acrylate having a linear or branched alkyl group containing ten or fewer carbon atoms at an ester site and a silicone-modified mono-functional (meth)acrylate.

In one or more embodiments, the initiator may include at least one selected from among a photo-radical initiator and a photo-cationic initiator.

In one or more embodiments, the adhesive composition may include 100 parts by weight of the (meth)acrylic copolymer, about 0.01 parts by weight to about 8 parts by weight of the curing agent, about 10 parts by weight to about 200 parts by weight of the mono- or higher functional monomer, about 0.1 parts by weight to about 20 parts by weight of the binder having a melting point of about 30° C. to about 60° C., and about 0.01 parts by weight to about 7.5 parts by weight of the initiator.

According to another aspect of one or more embodiments of the present invention, an optical member is provided.

According to one or more embodiments, an optical member includes a flexible panel and the adhesive film according to an embodiment of the present invention stacked on at least one surface of the flexible panel.

In one or more embodiments, the optical member may include the flexible panel including a flexible substrate, the adhesive film stacked on a lower surface of the flexible substrate, and a protective film stacked on a lower surface of the adhesive film.

According to another aspect of one or more embodiments of the present invention, an optical display apparatus including the adhesive film according to an embodiment of the present invention is provided.

DETAILED DESCRIPTION

Figure 1A:
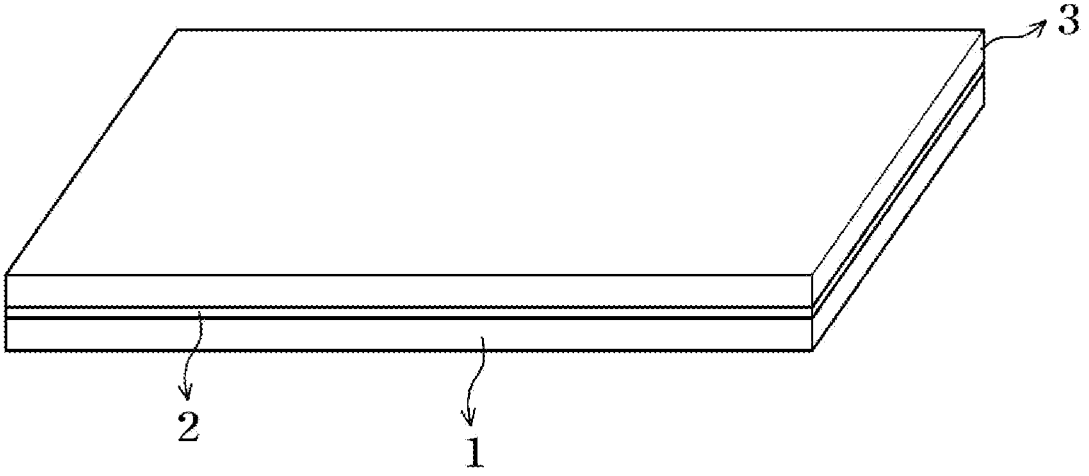
FIG. 1A is a view of a specimen for measurement of T-peel strength.

Herein, some embodiments of the present invention will be described in further detail. However, it is to be understood that the present invention is not limited to the following embodiments and may be embodied in different ways. The following embodiments are provided to provide a thorough understanding of the invention to those skilled in the art.

Herein, "(meth)acryl" refers to acryl and/or methacryl.

Herein, "copolymer" may include a polymer or a resin.

Herein, "binder" refers to a compound having a lower weight average molecular weight than an adhesive polymer or an adhesive resin, for example, a weight average molecular weight of about 10,000 g/mol to about 100,000 g/mol.

Herein, "glass transition temperature" may refer to a glass transition temperature (Tg) measured on a target compound using a DSC Discovery (TA Instruments). Specifically, a homopolymer of a target monomer is heated to about 180° C. at a heating rate of about 20° C./min, is slowly cooled to about −100° C., and is heated again to about 100° C. at a heating rate of 10° C./min to obtain data of an endothermic transition curve. An inflection point of the endothermic transition curve may be defined as the glass transition temperature of a target monomer in a homopolymer phase.

Herein, "melting point" may refer to a melting point (Tm) measured using a DSC Discovery (TA Instruments). Specifically, a target binder is heated to about 180° C. at a heating rate of about 20° C./min, is slowly cooled to about −100° C., and is heated again to about 100° C. at a heating rate of 10° C./min to obtain data of an endothermic transition curve. An inflection point of the endothermic transition curve may be defined as the melting point of the target binder.

Herein, "peel strength" may refer to T-peel strength.

As used herein to represent a specific numerical range, the expression "X to Y" means a value greater than or equal to X and less than or equal to Y (X≤ and ≤Y).

An adhesive film according to embodiments of the present invention is an adhesive film having low peel strength (initial peel strength) and not subjected to irradiation with light and heat treatment. The adhesive film according to embodiments of the present invention exhibits a suitable range of peel strength before irradiation with light. Thus, the adhesive film can be adhered at low peel strength to an adherend to provide temporary protection to the adherend and can be easily removed therefrom without deformation and/or damage to the adherend. Accordingly, the adhesive film according to embodiments of the present invention can be used as a temporary protective film for processes with respect to a flexible panel substrate, e.g., a flexible OLED panel substrate. In terms of this feature, the adhesive film according to embodiments of the present invention is distinguished from a coat for formation of an adhesive film, which exhibits no peel strength before irradiation with light upon formation of the adhesive film using a typical photocurable adhesive composition, in which the coat does not have a function of temporarily protecting the adherend.

In an embodiment, the adhesive film according to the present invention has an initial peel strength of greater than 0 gf/inch to about 100 gf/inch, and, in an embodiment, 0.1 gf/inch, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, for example, about 10 gf/inch to about 100 gf/inch, about 20 gf/inch to about 70 gf/inch, or about 30 gf/inch to about 70 gf/inch. The initial peel strength may be realized by an adhesive composition including a (meth)acrylic copolymer, a curing agent, a mono- or higher functional monomer, a binder having a melting point (Tm) of about 30° C. to about 60° C., and an initiator. These components will be described in further detail below.

The adhesive film according to embodiments of the present invention exhibits significant increase in peel strength after irradiation with light and heat treatment, as compared with peel strength before irradiation with light. Since the adhesive film according to the present invention exhibits significant increase in peel strength after irradiation with light and heat treatment, the adhesive film is adhered to an adherend to provide permanent protection to the adherend, thereby improving durability of an optical member including the adherend to which the adhesive film is adhered.

Accordingly, the adhesive film according to embodiments of the present invention can achieve both temporary protection and permanent protection with respect to an adherend and can be used as a temporary protective film for processes and a protective film for reinforcement, thereby enabling process simplification, economic feasibility and environmental friendliness. The temporary protective film for processes may be a film that is temporarily adhered to the adherend and then removed therefrom to temporarily protect the adherend. The protective film for reinforcement may be a film that is permanently adhered to the adherend to protect the adherend from external environments and is not removed from the adherend.

The adhesive film according to embodiments of the present invention is subjected to irradiation with light and heat treatment in order to improve peel strength with respect to the adherend, in which the sequence of irradiation with light and heat treatment is not particularly limited. That is, the adhesive film may be sequentially subjected to irradiation with light and heat treatment, or vice versa. In an embodiment, the adhesive film is sequentially subjected to irradiation with light and heat treatment to achieve effective increase in peel strength.

The adhesive film according to embodiments of the present invention can be used as a protective film for reinforcement. The protective film for reinforcement refers to a protective film that is stacked on at least one surface of a flexible panel and protects the flexible panel from external impact.

In addition, the adhesive film according to embodiments of the present invention can be used as a protective film for reinforcement of patterns, which is stacked on a flexible panel and is then selectively partially peeled off to form patterns on the remaining adhesive film.

Herein, "adherend" refers to a plastic film, for example, a polyimide film, a polycarbonate film, a polyester film, such as a polyethylene naphthalate film, a polyethylene terephthalate film, and the like, a polyether sulfone film, and a polyurethane film. In an embodiment, the adherend is a polyimide film.

The polyimide film is a polymer film prepared through polymerization of a polyamic acid acting as a precursor and containing an imide group and an aromatic group in a repeat unit, and has good mechanical properties to be broadly used as a substrate of a flexible OLED panel.

Herein, an adhesive film according to one or more embodiments of the present invention will be described.

The adhesive film according to one or more embodiments of the present invention (herein referred to as "adhesive film") has a peel strength increase rate of 7.0 or more, as calculated by the following Equation 1. Within this range, the adhesive film can be adhered to an adherend with high peel strength and high reliability after irradiation with light and heat treatment to provide a bonding effect with respect to the adherend and can be used as a protective film for reinforcement:

$$\text{Peel strength increase rate} = P2/P1, \quad \text{Equation 1}$$

where P1 is an initial peel strength (unit: gf/inch) of the adhesive film with respect to an adherend, as measured on a specimen of the adhesive film and the adherend, and P2 is a peel strength of the adhesive film (unit: gf/inch) with respect to the adherend, as measured on the specimen of the adhesive film and the adherend after irradiation with light and heat treatment of the specimen.

In an embodiment, the peel strength increase rate of Equation 1 is in a range of about 7.0 to about 200, and, in an embodiment, 7.0, 8, 10, 20, 30, 40, 50, 60, 70, 80, 90, 100, 110, 120, 130, 140, 150, 160, 170, 180, 190, or 200, and, in an embodiment, about 10 to about 50, and, in an embodiment, about 10 to about 20. Within this range, the adhesive film can easily secure suitable initial peel strength and suitable peel strength after irradiation and heat treatment.

In an embodiment, the adhesive film may have a P1 value (initial peel strength) of greater than 0 gf/inch to about 100 gf/inch, and, in an embodiment, 0.1 gf/inch, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, for example, about 10 gf/inch to about 100 gf/inch, about 20 gf/inch to about 70 gf/inch, or about 30 gf/inch to about 70 gf/inch. Within this range, the adhesive film can be easily removed from an adherend without deformation and/or damage to the adherend and allows easy increase in peel strength after irradiation with light.

In an embodiment, the adhesive film may have a P2 value of about 500 gf/inch or more, and, in an embodiment, 500 gf/inch, 550 gf/inch, 600 gf/inch, 650 gf/inch, 700 gf/inch, 750 gf/inch, 800 gf/inch, 850 gf/inch, 900 gf/inch, 950 gf/inch, 1,000 gf/inch, 1,050 gf/inch, 1,100 gf/inch, 1,150 gf/inch, 1,200 gf/inch, 1,250 gf/inch, 1,300 gf/inch, 1,350 gf/inch, 1,400 gf/inch, 1,450 gf/inch, 1,500 gf/inch, 1,550 gf/inch, 1,600 gf/inch, 1,650 gf/inch, 1,700 gf/inch, 1,750 gf/inch, 1,800 gf/inch, 1,850 gf/inch, 1,900 gf/inch, 1,950 gf/inch, or 2,000 gf/inch, for example, about 500 gf/inch to about 2,000 gf/inch, about 700 gf/inch to about 2,000 gf/inch, or about 500 gf/inch to about 1,000 gf/inch. Within this range, the adhesive film can be adhered to an adherend with high peel strength and high reliability, thereby providing effective protection to the adherend.

Here, P2 is a value measured on a specimen of the adhesive film and the adherend after irradiation with light and heat treatment. According to embodiments of the present invention, despite physical change of the adhesive film due to improvement in cohesive strength and/or modulus of the adhesive film after irradiation with light and heat treatment and despite curing of the mono- or higher functional monomer by irradiation with light, shrinkage of the adhesive film is suppressed, and the binder having a melting point of about 30° C. to about 60° C. is allowed to diffuse on the surface of the adherend due to heat treatment and heat generated upon curing of the mono- or higher functional monomer by irradiation of the adhesive film with light, thereby improving peel strength of the adhesive film after irradiation with light and heat treatment. When the mono- or higher functional monomer is cured by irradiation with light, a typical adhesive film suffers from deterioration in peel strength through curing shrinkage, whereas shrinkage of the adhesive film according to embodiments of the present invention is suppressed even after irradiation with light. This feature will be described in further detail below.

Herein, "irradiation with light" may include irradiation of the adhesive film with light having a wavelength of about 280 nm to about 430 nm, for example, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, or 430 nm, and, in an embodiment, in the range of about 350 nm to about 390 nm, and at a dose of about 1,000 $mJ/cm^2$. UV irradiation may be performed using at least one of a UV LED, a high pressure mercury lamp, and a metal halide lamp.

Herein, "heat treatment" may include a process of leaving the adhesive film at a temperature higher than or equal to the melting point of the binder, for example, at a temperature of about 40° C. to about 60° C., for about 5 minutes to about 30 minutes.

The adhesive film according to the present invention is formed of an adhesive composition including a (meth)acrylic copolymer, a curing agent, a mono- or higher functional monomer, a binder having a melting point of about 30° C. to about 60° C., and an initiator.

In an embodiment, the adhesive film may have the mono- or higher functional monomer, the binder having a melting point of about 30° C. to about 60° C., and the initiator dispersed in a matrix of the adhesive film formed by curing the (meth)acrylic copolymer and the curing agent with heat.

(Meth)Acrylic Copolymer

The (meth)acrylic copolymer forms the matrix of the adhesive film and is cured by the curing agent to provide initial peel strength of the adhesive film. After irradiation with light, the (meth)acrylic copolymer can assist in improvement of modulus and cohesive strength of the adhesive film together with the mono- or higher functional monomer and the binder having a melting point of about 30° C. to about 60° C.

In an embodiment, the (meth)acrylic copolymer may have a glass transition temperature (Tg) of about −10° C. or less, and, in an embodiment, −70° C., −65° C., −60° C., −55° C., −50° C., −45° C., −40° C., −35° C., −30° C., −25° C., or −20° C., for example, about −60° C. to about −20° C. Within this range, the (meth)acrylic copolymer can assist in securing wettability (adhesive strength) of the adhesive film with respect to an adherend and initial peel strength of the adhesive film and can increase peel strength after irradiation with light through adjustment of the glass transition temperature together with the mono- or higher functional monomer and the binder having a melting point of about 30° C. to about 60° C.

In an embodiment, the (meth)acrylic copolymer may have a weight average molecular weight of about 500,000 g/mol or more, and, in an embodiment, 500,000 g/mol, 600,000 g/mol, 700,000 g/mol, 800,000 g/mol, 900,000 g/mol, 1,000,000 g/mol, 1,100,000 g/mol, 1,200,000 g/mol, 1,300,000 g/mol, 1,400,000 g/mol, or 1,500,000 g/mol, for example, about 600,000 g/mol to about 1,500,000 g/mol. Within this range, the (meth)acrylic copolymer can assist in securing wettability (adhesive strength) and initial peel strength of the adhesive film with respect to an adherend and can increase peel strength of the adhesive film.

In an embodiment, the (meth)acrylic copolymer may include a copolymer of a monomer mixture including an alkyl group-containing (meth)acrylic monomer and a hydroxyl group-containing (meth)acrylic monomer.

The alkyl group-containing (meth)acrylic monomer serves to form the matrix of the adhesive film and may include an unsubstituted $C_1$ to $C_{20}$ alkyl group-containing (meth)acrylic acid ester. For example, the alkyl group-containing (meth)acrylic monomer may include at least one selected from among methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, iso-octyl (meth)acrylate, nonyl (meth)acrylate, decyl (meth)acrylate, and lauryl (meth)acrylate.

In an embodiment, the alkyl group-containing (meth)acrylic monomer may be present in an amount of about 85 mol % to about 99.5 mol %, and, in an embodiment, about 90 mol % to about 98 mol %, or about 95 mol % to about 99 mol %, in the monomer mixture. Within this range, the adhesive film can exhibit good wettability (adhesive strength) with respect to an adherend and can secure suitable initial peel strength.

The hydroxyl group-containing (meth)acrylic monomer may be a (meth)acrylate containing at least one hydroxyl group. For example, the hydroxyl group-containing (meth)acrylate may be a (meth)acrylic acid ester containing a $C_1$ to $C_{20}$ alkyl group having at least one hydroxyl group, a (meth)acrylic acid ester containing a $C_5$ to $C_{20}$ cycloalkyl group having at least one hydroxyl group, or a (meth)acrylic acid ester containing a $C_6$ to $C_{20}$ aryl group having at least one hydroxyl group. The hydroxyl group-containing (meth)acrylate may include at least one selected from among 2-hydroxyethyl (meth)acrylate, 3-hydroxypropyl (meth)acrylate, 4-hydroxybutyl (meth)acrylate, hydroxyhexyl (meth)acrylate, 1,4-cyclohexanedimethanol mono(meth)acrylate, 1-chloro-2-hydroxypropyl (meth)acrylate, diethyleneglycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylol propane di(meth)acrylate, trimethylol ethane di(meth)acrylate, 2-hydroxy-3-phenyloxypropyl (meth)acrylate, 4-hydroxycyclopentyl (meth)acrylate, 4-hydroxycyclohexyl (meth)acrylate, and cyclohexane dimethanol mono(meth)acrylate.

In an embodiment, the hydroxyl group-containing (meth)acrylic monomer may be present in an amount of about 0.1 mol % to about 10 mol %, and, in an embodiment, 0.1 mol %, 0.5 mol %, 1 mol %, 1.5 mol %, 2 mol %, 2.5 mol %, 3 mol %, 3.5 mol %, 4 mol %, 4.5 mol %, 5 mol %, 5.5 mol %, 6 mol %, 6.5 mol %, 7 mol %, 7.5 mol %, 8 mol %, 8.5 mol %, 9 mol %, 9.5 mol %, or 10 mol %, for example, about 0.5 mol % to about 10 mol %, and, in an embodiment, about 2 mol % to about 10 mol %, and, in an embodiment, about 1 mol % to about 5 mol %, in the monomer mixture. Within this range, the adhesive composition can impart cohesive strength to an adhesive layer to form the adhesive layer and can secure suitable initial peel strength of the adhesive film.

The monomer mixture may further include a carboxylic acid-containing monomer. The carboxylic acid-containing monomer can assist in securing initial adhesive strength through improvement in cohesive strength between the (meth)acrylic binder and the curing agent. The carboxylic acid-containing monomer may include (meth)acrylic acid, without being limited thereto.

In an embodiment, the carboxylic acid-containing monomer may be present in an amount of about 0.05 mol % to about 5 mol %, and, in an embodiment, 0.05 mol %, 0.1 mol %, 0.5 mol %, 1 mol %, 1.5 mol %, 2 mol %, 2.5 mol %, 3 mol %, 3.5 mol %, 4 mol %, 4.5 mol %, or 5 mol %, for example, about 0.1 mol % to about 5 mol %, in the monomer mixture. Within this range, the adhesive composition can impart cohesive strength to an adhesive layer to form the adhesive layer and can secure suitable initial peel strength of the adhesive film.

In an embodiment, the monomer mixture may include a (meth)acrylic monomer, which has a glass transition temperature of about −80° C. or more, and, in an embodiment, −80° C., −75° C., −70° C., −65° C., −60° C., −55° C., −50° C., −45° C., −40° C., −35° C., −30° C., −25° C., −20° C., −15° C., −10° C., −5° C., or 0° C., for example, about −80° C. to about 0° C., and, in an embodiment, about −60° C. to about −20° C., in a homopolymer phase. Within this range, the monomer mixture can easily form a (meth)acrylic copolymer having a glass transition temperature within this above range.

The monomer mixture may include at least one selected from among methyl acrylate, acrylic acid, and methacrylic acid. With these monomers, the a (meth)acrylic copolymer having a glass transition temperature within this above range can be easily prepared.

The (meth)acrylic copolymer may be prepared through typical polymerization of the monomer mixture. Polymerization may include a typical method well-known to those skilled in the art. For example, the (meth)acrylic copolymer may be prepared by adding a radical initiator to the monomer mixture, followed by typical copolymerization, for example, suspension polymerization, emulsion polymerization, solution polymerization, and the like. In an embodiment, polymerization may be performed at about 60° C. to about 70° C. for about 6 hours to about 8 hours. The initiator may include a typical initiator including azo-based polymerization initiators and/or peroxides, such as benzoyl hydroxide or acetyl hydroxide.

Curing Agent

The curing agent can assist in formation of the matrix of the adhesive film through heat curing of the (meth)acrylic copolymer and in securing initial peel strength of the adhesive film.

The curing agent may be a heat curing agent and may include at least one selected from among an isocyanate curing agent, a metal chelate curing agent, a carbodiimide curing agent, an aziridine curing agent, and an epoxy curing agent. In an embodiment, an isocyanate curing agent or a mixture of an isocyanate curing agent and a metal chelate curing agent is used. The mixture of these curing agents allows easy implementation of the advantageous effects of the present invention.

The isocyanate curing agent may include a bi- or higher functional, specifically bi- to hexa-functional isocyanate curing agent. In an embodiment, the isocyanate curing agent may include at least one selected from among xylene diisocyanate (XDI) including m-xylene diisocyanate and the like, methylenebis(phenyl isocyanate) (MDI) including 4,4'-methylenebis(phenyl isocyanate) and the like, naphthalene diisocyanate, toluene diisocyanate, hexamethylene diisocyanate, and isophorone diisocyanate, or adducts thereof. For example, the adducts may include trimethylol propane adducts of toluene diisocyanate, trimethylol propane adducts of hexamethylene diisocyanate, trimethylol propane adducts of isophorone diisocyanate, trimethylol propane adducts of xylene diisocyanate, isocyanurates of toluene diisocyanate, isocyanurates of hexamethylene diisocyanate, and isocyanurates of isophorone diisocyanate. The isocyanate curing agent may include at least one of these compounds.

In an embodiment, the isocyanate curing agent may be present in an amount of about 5 parts by weight or less, and, in an embodiment, 0.001, 0.005, 0.1, 0.5, 1, 1.5, 2, 2.5, 3, 3.5, 4, 4.5, or 5 parts by weight, for example, about 0.001 parts by weight to about 3 parts by weight, and, in an embodiment, about 0.01 parts by weight to about 1 part by weight, relative to 100 parts by weight of the (meth)acrylic copolymer. Within this range, the adhesive composition can improve reliability of the adhesive film.

The metal chelate curing agent may include a typical metal chelate curing agent. For example, the metal chelate curing agent may be a curing agent containing a metal, such as any of aluminum, iron, copper, zinc, tin, titanium, nickel, antimony, magnesium, vanadium, chromium, and zirconium. For example, the metal chelate curing agent may include at least one selected from among aluminum ethyl acetoacetate diisopropylate, aluminum tris(ethyl acetoacetate), alkyl acetoacetate aluminum diisopropylate, aluminum isopropylate, mono-sec-butoxyaluminum diisopropylate, aluminum-sec-butyrate, aluminum ethylate, tetraisopropyl titanate, tetra-normal butyl titanate, butyl titanate dimer, titanium acetyl acetonate, titanium octylene glycolate, titanium tetra-acetyl acetonate, titanium ethyl acetate, polyhydroxytitanium stearate, and aluminum acetyl acetonate.

In an embodiment, the metal chelate curing agent may be present in an amount of about 3 parts by weight or less, and, in an embodiment, 0.001, 0.005, 0.1, 0.5, 1, 1.5, 2, 2.5, or 3 parts by weight, for example, about 0.001 parts by weight to about 1 part by weight, and, in an embodiment, about 0.01 parts by weight to about 1 part by weight, relative to 100 parts by weight of the (meth)acrylic copolymer. Within this range, the metal chelate curing agent can provide additional effects without affecting effects of the adhesive film according to the present invention.

In an embodiment, the curing agent may be present in an amount of about 0.01 parts by weight to about 8 parts by weight, and, in an embodiment, 0.01, 0.05, 1, 2, 3, 4, 5, 6, 7, or 8 parts by weight, for example, about 0.01 parts by weight to about 3 parts by weight, and, in an embodiment, about 0.1 parts by weight to about 2 parts by weight, relative to 100 parts by weight of the (meth)acrylic copolymer. Within this range, the adhesive composition can improve reliability of the adhesive film.

Mono- or Higher Functional Monomer

The mono- or higher functional monomer has at least one functional group reacted by an initiator. The functional group may refer to a UV curable, vinyl group or a (meth) acrylate group.

The mono- or higher functional monomer may improve cohesive strength and/or modulus of the adhesive film after irradiation with light. Accordingly, when the adhesive film adhered to a surface of an adherend is subjected to photo-curing, the mono- or higher functional monomer allows the adhesive film to be adhered to the adherend with higher peel strength, thereby improving peel strength of the adhesive film.

In an embodiment, the mono- or higher functional monomer has two or fewer functional groups. As a result, the mono- or higher functional monomer can effectively prevent or substantially prevent excessive shrinkage of the adhesive film upon curing through irradiation with light.

It is desirable that a homopolymer of the mono- or higher functional monomer have a glass transition temperature in a certain range (e.g., a predetermined range), as compared with the glass transition temperature of the (meth)acrylic copolymer. As a result, even when the adhesive film is cured by irradiation with light, shrinkage of the adhesive film is suppressed to improve peel strength of the adhesive film after irradiation with light.

In an embodiment, a homopolymer of the mono- or higher functional monomer has a higher glass transition temperature than the (meth)acrylic copolymer, and a difference in glass transition temperature between the mono- or higher functional monomer in a homopolymer phase and the (meth) acrylic copolymer may be about 20° C. or more, and, in an embodiment, 20° C., 25° C., 30° C., 35° C., 40° C., 45° C., 50° C., 55° C., 60° C., 65° C., 70° C., 75° C., 80° C., 85° C., 90° C., 95° C., 100° C., 110° C., 115° C., or 120° C., for example, about 20° C. to about 120° C., or about 40° C. to about 100° C. Within this range, the mono- or higher functional monomer can increase peel strength of the adhesive film after irradiation with light.

In an embodiment, the mono- or higher functional monomer may have a glass transition temperature of about −30° C. or more, and, in an embodiment, −30° C., −25° C., −20° C., −15° C., −10° C., −5° C., 0° C., 5° C., 10° C., 15° C., 20° C., 25° C., 30° C., 35° C., 40° C., 45° C., or 50° C., for example, about −30° C. to about 50° C., in a homopolymer phase. Within this range, the homopolymer of the mono- or higher functional monomer has a higher glass transition temperature than the (meth)acrylic copolymer, thereby securing increase in peel strength of the adhesive film through improvement in cohesive strength after irradiation with light.

The mono- or higher functional monomer may include a mono- or higher functional (meth)acrylate having a linear or branched $C_1$ to $C_{20}$ alkyl group, and, in an embodiment, $C_8$ to $C_{20}$ alkyl group, or a linear or branched $C_1$ to $C_{20}$ alkylene group, and, in an embodiment, $C_6$ to $C_{20}$ alkylene group, at an ester site. For example, the mono- or higher functional monomer may include at least one selected from among lauryl (meth)acrylate, stearyl (meth)acrylate, methyl acrylate, n-butyl methacrylate, and 1,6-hexanediol diacrylate.

In an embodiment, the mono- or higher functional monomer may include an aromatic group-containing mono- or higher functional monomer including at least one aromatic group.

Here, "aromatic group" may refer to a group containing a $C_6$ to $C_{50}$ monocyclic or heterocyclic ring. For example, the aromatic group may mean a substituted or unsubstituted, phenyl group, a biphenyl group, a terphenyl group, a naphthalenyl group, and the like.

The aromatic group-containing mono- or higher functional monomer helps improve adhesive strength of the adhesive film by improving tackiness of the adhesive film with respect to an adherend, for example, an aromatic group-containing plastic film, and, in an embodiment, a polyimide film, through stacking effects by the π-π bond thereto. In addition, the aromatic group is a bulky substituent, as compared with a linear or branched alkyl group, and is inserted between a cured network structure of the (meth) acrylic copolymer and the curing agent, for example, between interpenetrating polymer networks (IPNs) or semi-IPNs, before irradiation with light, thereby suppressing excessive increase in initial peel strength of the adhesive film with respect to the adherend.

The aromatic group-containing mono- or higher functional monomer may include a compound of the following Formula 1, without being limited thereto:

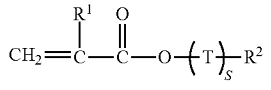

where $R^1$ is a hydrogen atom or a methyl group; s is an integer of 0 to 10; $R^2$ is a substituted or unsubstituted $C_6$ to $C_{50}$ aryl group or a substituted or unsubstituted $C_6$ to $C_{50}$ aryloxy group; and T is a substituted or unsubstituted $C_1$ to $C_6$ alkylene group or a substituted or unsubstituted $C_1$ to $C_6$ alkylene oxy group.

Herein, in "substituted or unsubstituted," "substituted" means that at least one hydrogen atom is substituted with a $C_1$ to $C_{10}$ alkyl group, a $C_1$ to $C_{10}$ thio-alkyl group, a $C_1$ to $C_{10}$ alkoxy group, a halogen (F, Cl, Br or I), a $C_3$ to $C_{10}$ cycloalkyl group, or a $C_6$ to $C_{20}$ aryl group.

In an embodiment, $R^2$ may be a substituted or unsubstituted phenoxy group, phenyl group, benzyl group, biphenyl group, ter-phenyl group, or phenyl phenyl group.

In an embodiment, the aromatic group-containing mono- or higher functional monomer may include at least one selected from the group consisting of phenoxy (meth)acrylate, phenoxy benzyl (meth)acrylate, 2-ethylphenoxy (meth) acrylate, benzyl (meth)acrylate, phenyl (meth)acrylate, 2-ethylthiophenyl (meth)acrylate, 2-phenylethyl (meth) acrylate, 3-phenylpropyl (meth)acrylate, 4-phenylbutyl (meth)acrylate, 2-(2-methylphenyl)ethyl (meth)acrylate, 2-(3-methylphenyl)ethyl (meth)acrylate, 2-(4-methylphenyl)ethyl (meth)acrylate, 2-(4-propylphenyl)ethyl (meth) acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl) ethyl (meth)acrylate, 2-(3-phenylphenyl)ethyl (meth)acrylate, ortho-biphenyl (meth)acrylate, meta-biphenyl (meth) acrylate, para-biphenyl (meth)acrylate, 2,6-terphenyl (meth) acrylate, ortho-terphenyl (meth)acrylate, meta-terphenyl (meth)acrylate, para-terphenyl (meth)acrylate, 4-(4-methylphenyl)phenyl (meth)acrylate, 4-(2-methylphenyl)phenyl (meth)acrylate, 2-(4-methylphenyl)phenyl (meth)acrylate, 2-(2-methylphenyl)phenyl (meth)acrylate, 4-(4-ethylphenyl)phenyl (meth)acrylate, 4-(2-ethylphenyl)phenyl (meth) acrylate, 2-(4-ethylphenyl)phenyl (meth)acrylate, 2-(2-ethylphenyl)phenyl (meth)acrylate, biphenylmethyl (meth) acrylate, naphthyl (meth)acrylate, ethoxylated phenyl (meth)acrylate, ethoxylated phenyl phenol (meth)acrylate, and mixtures thereof.

In an embodiment, the aromatic group-containing mono- or higher functional monomer includes at least one selected from among benzyl (meth)acrylate, ethylene glycol phenyl ether acrylate, ethoxylated phenyl acrylate, ethoxylated phenyl phenol acrylate, phenoxy benzyl (meth)acrylate, biphenyl methyl (meth)acrylate, and naphtyl (meth)acrylates including 1-naphthyl (meth)acrylate, 2-naphthyl (meth) acrylate, and the like.

In an embodiment, the mono- or higher functional monomer may be present in an amount of about 10 parts by weight to about 200 parts by weight, and, in an embodiment, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 parts by weight, for example, about 30 parts by weight to about 150 parts by weight, and, in an embodiment, about 50 parts by weight to about 120 parts by weight, relative to 100 parts by weight of the (meth)acrylic copolymer. Within this range, the adhesive composition can assist in increase in peel strength of the adhesive film after irradiation with light and can suppress shrinkage of the adhesive film.

Binder Having a Melting Point of about 30° C. To about 60° C.

The binder having a melting point of about 30° C. to about 60° C. serves to improve peel strength of the adhesive film through heat treatment. The binder having a melting point of about 30° C. to about 60° C. is diffused on the surface of the adherend through improvement in flowability by heat treatment and heat generated upon curing of a UV curable monomer by irradiation with light and is crystallized again on the surface of the adherend to improve peel strength of the adhesive film through an anchorage effect when the adhesive film is left at room temperature.

The melting point of "30° C. to 60° C." is set to achieve increase in peel strength through irradiation with light and heat treatment in the adhesive composition including the (meth)acrylic copolymer, the curing agent, the mono- or higher functional monomer, and the initiator. At a melting point of less than 30° C., since side chains of the binder can be non-crystallized to have high flowability even before a process (e.g., a predetermined process), the adhesive film has high initial peel strength, causing deterioration in performance as a temporary protective film. At a melting point of greater than 60° C., the binder does not suffer from variation in flowability through crystallization of the side chains of the binder, thereby providing insignificant increase in peel strength.

In an embodiment, the binder may have a melting point of about 30° C. to about 60° C., and, in an embodiment, 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C. or 60° C., for example, about 30° C. to about 50° C., and, in an embodiment, about 30° C. to about 40° C. Within this range, the adhesive film can exhibit better increase in peel strength.

The binder may have any suitable composition so long as the binder has the above melting point. The binder may be formed of one type of monomer or at least two types of monomers. In an embodiment, the binder is formed of a monomer mixture including at least two monomers in order to easily reach the melting point according to embodiments of the present invention.

For the binder, the monomer mixture may include a (meth)acrylate (herein, "first monomer") having a linear or branched $C_{16}$ to $C_{22}$ alkyl group at an ester site. In preparation of the binder, the first monomer allows the binder to easily reach the melting point according to embodiments of the present invention. The first monomer may include stearyl (meth)acrylate and/or cetyl (meth)acrylate.

In an embodiment, the first monomer may be present in an amount of 100 mol % or less, and, in an embodiment, 70 mol %, 75 mol %, 80 mol %, 85 mol %, 90 mol %, or 100 mol %, for example, about 70 mol % to about 100 mol %, and, in an embodiment, in a range of about 70 mol % to about 99 mol %, about 90 mol % to about 99 mol %, or about 90 mol % to about 100 mol %, in the monomer mixture. Within this range, the binder can reach the melting point according to embodiments of the present invention and can improve peel strength after heat treatment.

The monomer mixture may further include a monomer (herein, "second monomer"), which can form the binder through polymerization with the first monomer.

The second monomer may include at least one of a silicone-free monomer that does not contain silicon and a silicone-based monomer that contains silicon. In an embodiment, the second monomer includes a silicone-based monomer.

The silicone-based monomer reduces peel strength of the adhesive film with respect to an adherend, improves wettability of the adhesive film to the adherend, and promotes increase in peel strength by allowing the adhesive film to better permeate the surface of the adhesive film.

The silicone-based monomer may include a silicone-modified mono-functional (meth)acrylate. For example, the silicone-based monomer may include a compound of the following Formula 2:

Formula 2

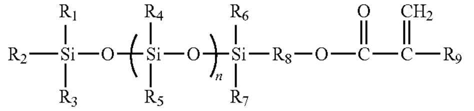

where $R_1$, $R_2$, $R_3$, $R_4$, $R_5$, $R_6$, and $R_7$ are each independently a hydrogen atom, a $C_1$ to $C_{10}$ alkyl group, a $C_3$ to $C_{10}$ cycloalkyl group or $C_6$ to $C_{10}$ aryl group; $R_8$ is a $C_1$ to $C_{10}$ alkylene group or a $C_6$ to $C_{10}$ arylene group; $R_9$ is a hydrogen atom or a methyl group; and n is an integer of 10 to 100.

In an embodiment, the silicone-based monomer may include a compound of the following Formula 3:

Formula 3

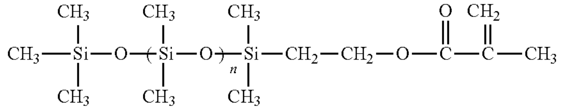

where n is an integer of 10 to 100.

The silicone-based monomer may be prepared by a typical method known to those skilled in the art or obtained from commercially available products.

The silicone-free monomer may include a (meth)acrylate having a linear or branched alkyl group having 10 or fewer carbon atoms, for example, 4 to 10 carbon atoms, at an ester site. For example, the silicone-free monomer may include t-butyl (meth)acrylate and the like.

In an embodiment, the second monomer may be present in an amount of about 1 mol % to about 30 mol %, and, in an embodiment, about 1 mol % to about 10 mol %, in the monomer mixture. Within this range, the binder can reach the melting point according to embodiments of the present invention and can increase peel strength of the adhesive film after heat treatment.

The binder may be prepared using the monomer mixture by a typical method known to those skilled in the art.

In an embodiment, the binder having a melting point of about 30° C. to about 60° C. may be present in an amount of about 0.1 parts by weight to about 20 parts by weight, and, in an embodiment, 0.1, 0.5, 1, 2, 3, 4, 5, 6, 7, 8, 9, 10, 11, 12, 13, 14, 15, 16, 17, 18, 19, or 20 parts by weight, for example, about 0.5 parts by weight to about 5 parts by weight, relative to 100 parts by weight of the (meth)acrylic copolymer. Within this range, the binder can provide an effect of improving peel strength of the adhesive film through heat treatment.

Initiator

The initiator serves to allow physical change of the adhesive film through irradiation with light by curing the mono- or higher functional monomer. The initiator may include at least one selected from among a photo-radical initiator and a photo-cationic initiator, and may further include a heat initiator.

In an embodiment, the initiator may include a photo initiator having a maximum absorption wavelength within an irradiation wavelength range applied to irradiation with light. For example, the photo initiator may have a maximum absorption wavelength in a wavelength range of about 280 nm to about 430 nm. Within this range, the initiator allows curing of the mono- or higher functional monomer through irradiation with light. In an embodiment, the photo initiator may include any of a phosphorus initiator, a ketone initiator, and the like, without being limited thereto.

In an embodiment, the initiator may be present in an amount of about 0.01 parts by weight to about 7.5 parts by weight, and, in an embodiment, about 0.15 parts by weight to about 4.5 parts by weight, relative to 100 parts by weight of the (meth)acrylic copolymer. Within this range, the initiator can secure uniform curing of the mono- or higher functional monomer through irradiation with light without deterioration in transparency of the adhesive film due to remaining initiator.

In an embodiment, the initiator may be present in an amount of about 0.01 parts by weight to about 5 parts by weight, and, in an embodiment, about 0.5 parts by weight to about 3 parts by weight, relative to 100 parts by weight of the mono- or higher functional monomer. Within this range, the initiator can secure uniform curing of the mono- or higher functional monomer through irradiation with light without deterioration in transparency of the adhesive film due to remaining initiator.

The adhesive composition may further include a curing accelerator.

The curing accelerator assists in curing reaction of the adhesive film to further improve cohesive strength of the adhesive layer. The curing accelerator may include a typical curing accelerator known to those skilled in the art. In an embodiment, the curing accelerator may include any of a tin-based metal compound, a zinc metal compound, an amine compound, a titanium-based metal compound, a bismuth-based metal compound, and an aluminum-based metal compound. In an embodiment, among these compounds, a tin-based metal compound is used. For example, the curing accelerator may include tetravalent or divalent organotin-based compounds, such as dibutyl tin dilaurate, bis-acetyl acetonate-dibutyltin, dibutyl tin dimaleate, and dimaleate tin, without being limited thereto.

In an embodiment, the curing accelerator may be present in an amount of about 0.001 parts by weight to about 3 parts by weight relative to 100 parts by weight of the (meth) acrylic copolymer. Within this range, the curing accelerator can increase the curing rate of the adhesive film while improving cohesive strength of the adhesive film.

The adhesive composition may further include a silane coupling agent.

The silane coupling agent can further increase peel strength of the adhesive film. The silane coupling agent may include a typical silane coupling agent known to those skilled in the art. For example, the silane coupling agent may include any of epoxy group-containing silane coupling agents, such as glycidoxypropyltrimethoxysilane and glycidoxypropylmethyldimethoxysilane, without being limited thereto.

In an embodiment, the silane coupling agent may be present in an amount of about 0.01 parts by weight to about 5 parts by weight relative to 100 parts by weight of the (meth)acrylic copolymer. Within this range, the silane coupling agent can further improve peel strength of the adhesive film.

The adhesive composition may further include additives. The additives may include typical additives known to those skilled in the art. For example, the additives may include at least one selected from among pigments, UV absorbents, antioxidants, leveling agents, antistatic agents, retarders, and rework agents, without being limited thereto.

The adhesive composition may further include a solvent. The solvent can increase coatability of the adhesive composition to produce an adhesive film having a thin thickness and a uniform surface. The solvent may include typical solvents known to those skilled in the art. For example, the solvent may include any of methyl ethyl ketone, methyl isobutyl ketone, ethyl acetate, and toluene, without being limited thereto. In an embodiment, the adhesive composition may include a solid content of the adhesive film in 15 wt % to 40 wt %, and, in an embodiment, 20 wt % to 30 wt %. Within this range, the adhesive composition can exhibit good coatability.

In an embodiment, the adhesive film may have a haze of about 5% or less, specifically about 0.1% to about 2%, and a total luminous transmittance of about 80% or more, and, in an embodiment, about 85% to about 95%, in the visible spectrum (for example: in the wavelength range of 380 nm to 780 nm). Within this range, the adhesive film has good transparency to be used in an optical display apparatus.

In an embodiment, an adhesive layer of the adhesive film may have a thickness of about 200 μm or less, and, in an embodiment, greater than about 0 μm to about 100 μm, and, in an embodiment, about 5 μm to about 50 μm. Within this range, the adhesive film can act as a protective film for a flexible panel.

An optical member according to one or more embodiments of the present invention includes a flexible panel and an adhesive film formed on at least one surface of the flexible panel, wherein the adhesive film includes the adhesive film according to an embodiment of the present invention.

An optical member according to an embodiment of the present invention includes a flexible panel including a flexible substrate, an adhesive film stacked on a lower surface of the flexible substrate, and a protective film stacked on a lower surface of the adhesive film.

The optical member may include the flexible substrate, the adhesive film stacked on the lower surface of the flexible substrate, and the protective film stacked on the lower surface of the adhesive film. In an embodiment, the lower surface of the flexible substrate may be opposite to a direction in which light is emitted from the flexible panel.

The flexible substrate may serve to support an optical element, such as an organic light emitting diode and the like. The flexible substrate is a plastic film and may include, for example, a polyimide film, a polyester film, such as a polyethylene naphthalate film, a polyethylene terephthalate film, and the like, a polycarbonate film, a polyether sulfone film, and the like.

The protective layer may be formed of any suitable material so long as the protective layer is optically clear and can secure flexibility. For example, the protective layer may include a protective film including a polyester film, such as a polyethylene naphthalate film, a polyethylene terephthalate film, and the like, a polycarbonate film, a polyether sulfone film, and the like.

In an embodiment, an optical element may be further stacked on an upper surface of the flexible substrate. The optical element provides optical functions, for example, light emission, polarization, optical compensation, display quality improvement, and/or conductivity, to a display apparatus. Examples of the optical element may include an OLED device, a window film, a window, a polarizing plate, a color filter, a retardation film, an elliptical polarizing film, a reflective polarizing film, an anti-reflection film, a compensation film, a brightness enhancing film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like.

The optical member may be manufactured through modification of a typical method known to those skilled in the art. For example, the optical member may be manufactured by preparing a flexible panel including a flexible substrate, bonding a laminate of an adhesive film and a protective layer to a lower surface of the flexible substrate, and bonding the laminate of the adhesive film and the protective layer to the flexible panel with high bonding strength through irradiation with light, when there is no defect, such as appearance abnormality or foreign matter, on the flexible substrate or the flexible panel. However, when there is no defect, such as appearance abnormality or foreign matter, on the flexible substrate or the flexible panel, the laminate of the adhesive film and the protective layer is removed from the flexible panel.

An optical display apparatus according to one or more embodiments of the present invention includes an adhesive film according to an embodiment of the present invention.

The optical display apparatus may include an organic light emitting diode display, a liquid crystal display, and the like. The optical display apparatus may include a flexible display. However, the optical display apparatus may include a non-flexible display.

Next, embodiment of the present invention will be described in further detail with reference to some examples. However, it is to be understood that these examples are provided for illustration and should not be construed in any way as limiting the present invention.

Preparative Example 1

Ethyl acetate was placed as a solvent in a 1 L reactor equipped with a cooler for easy temperature regulation under a nitrogen purging condition. 100 parts by weight of a monomer mixture including 85 mol % of n-butyl acrylate (BA), 10 mol % of methyl acrylate (MA), 4 mol % of 4-hydroxy butyl acrylate (4HBA) and 1 mol % of acrylic acid (AA) was added to the reactor. Oxygen was removed from the monomer mixture by supplying nitrogen gas to the monomer mixture for 30 minutes, followed by maintaining the reactor at 62° C. With the monomer mixture uniformly stirred, 0.08 parts by weight of an initiator (V-601, azo-based radical initiator, Wako Chemicals Co., Ltd.) was added thereto and reacted at 62° C. for 8 hours, thereby preparing a (meth)acrylic copolymer (weight average molecular weight: 1,298,112 g/mol, glass transition temperature: −50° C.). A (meth)acrylic copolymer solution (solid content: 30 wt %) was prepared by adding ethyl acetate as a solvent to the (meth)acrylic copolymer.

Preparative Examples 2 and 3

(Meth)acrylic copolymer solutions were prepared by the same method as in Preparative Example 1 except that the content of each monomer was changed as listed in Table 1 (unit: mol %). In Table 1, "-" means that a corresponding component was not used.

TABLE 1

| Monomer | Preparative Example 1 | Preparative Example 2 | Preparative Example 3 |
|---|---|---|---|
| BA | 85 | 54 | 63 |
| MA | 10 | 41 | 35 |
| 4HBA | 4 | 3 | 2 |
| AA | 1 | 2 | — |
| Copolymer Mw (g/mol) | 1,298,112 | 1,001,829 | 662,091 |
| Copolymer Tg (° C.) | −50 | −31 | −21 |

Preparative Example 4

Toluene was placed as a solvent in a 1 L reactor equipped with a cooler for easy temperature regulation under a nitrogen purging condition. 100 parts by weight of a monomer mixture including 98 mol % of stearyl methacrylate (STMA) and 2 mol % of silicone acrylate (KF-2012, Shin-Etsu Chemical Co., Ltd.) was added to the reactor. Oxygen was removed from the monomer mixture by supplying nitrogen gas to the monomer mixture for 30 minutes, followed by maintaining the reactor at 70° C. With the monomer mixture uniformly stirred, 0.2 parts by weight of an initiator (V-601, azo-based radical initiator, Wako Chemicals Co., Ltd.) was added thereto and reacted at 70° C. for 4 hours, thereby preparing a binder (melting point: 38° C.) comprising stearyl methacrylate and silicone acrylate. A binder solution (solid content: 30 wt %) was prepared by adding toluene as a solvent to the binder.

Preparative Example 5

Toluene was placed as a solvent in a 1 L reactor equipped with a cooler for easy temperature regulation under a nitrogen purging condition. 100 parts by weight of a monomer mixture including 95 mol % of stearyl methacrylate (STMA) and 5 mol % of t-butyl acrylate was added to the reactor. Oxygen was removed from the monomer mixture by supplying nitrogen gas to the monomer mixture for 30 minutes, followed by maintaining the reactor at 76° C. With the monomer mixture uniformly stirred, 0.2 parts by weight of an initiator (V-601, azo-based radical initiator, Wako Chemicals Co., Ltd.) was added thereto and reacted at 76° C. for 4 hours, thereby preparing a binder (melting point: 38° C.) comprising stearyl methacrylate and t-butyl acrylate. A binder solution (solid content: 30 wt %) was prepared by adding toluene as a solvent to the binder.

Example 1

In terms of solid content, 100 parts by weight of the (meth)acrylic copolymer (Tg: −50° C.) prepared in Preparative Example 1, 0.5 parts by weight of an isocyanate curing agent (TD-75, Soken Co., Ltd.) and 0.3 parts by weight of metal chelate curing agent (Hardener M-2, aluminum chelate curing agent, Saiden Co., Ltd.) as curing agents, 0.2 parts by weight of a curing accelerator (accelerator S, tin-based curing accelerator, Soken Co., Ltd.), 80 parts by weight of lauryl acrylate (Miwon Specialty Chemical Co., Ltd., homopolymer Tg: −23° C.) as a mono-functional monomer, 0.5 parts by weight of an initiator (Irgacure TPO, phosphorus initiator, (BASF), and 3 parts by weight of the binder prepared in Preparative Example 4 were added and diluted with methyl ethyl ketone, thereby preparing an adhesive composition (solid content: 30 wt %).

The prepared adhesive composition was coated to a thickness of 13 μm on a primer coating surface of a polyethylene terephthalate (PET) film as a base film (SKC, thickness: 75 μm, with one surface subjected to urethane primer coating) and dried at 90° C. for 4 min. A release film (thickness: 25 μm, one surface subjected to silicone release treatment) was bonded to an adhesive layer and left at 50° C. for 2 days, thereby preparing an adhesive film-containing sheet in which the adhesive film (thickness: 13 μm) and the release film are sequentially stacked on the base film.

Examples 2 to 7

Adhesive film-containing sheets were prepared by the same method as in Example 1 except that the kind and content of each component were changed as listed in Table 2. In Table 2, "-" means that a corresponding component was not used.

Comparative Examples 1 and 2

Adhesive film-containing sheets were prepared by the same method as in Example 1 except that the kind and content of each component were changed as listed in Table 2.

Herein, among the components used in the Examples and Comparative Examples, the mono- or higher functional monomers were as follows.

Monomer A: Lauryl acrylate

Monomer B: 1,6-hexanediol diacrylate

Monomer C: Benzyl acrylate

Monomer D: Ethylene glycol phenyl ether acrylate

Each of the adhesive film-containing sheets manufactured in the Examples and Comparative Examples was evaluated as to the following properties and results are shown in Table 2.

Figure 1B:
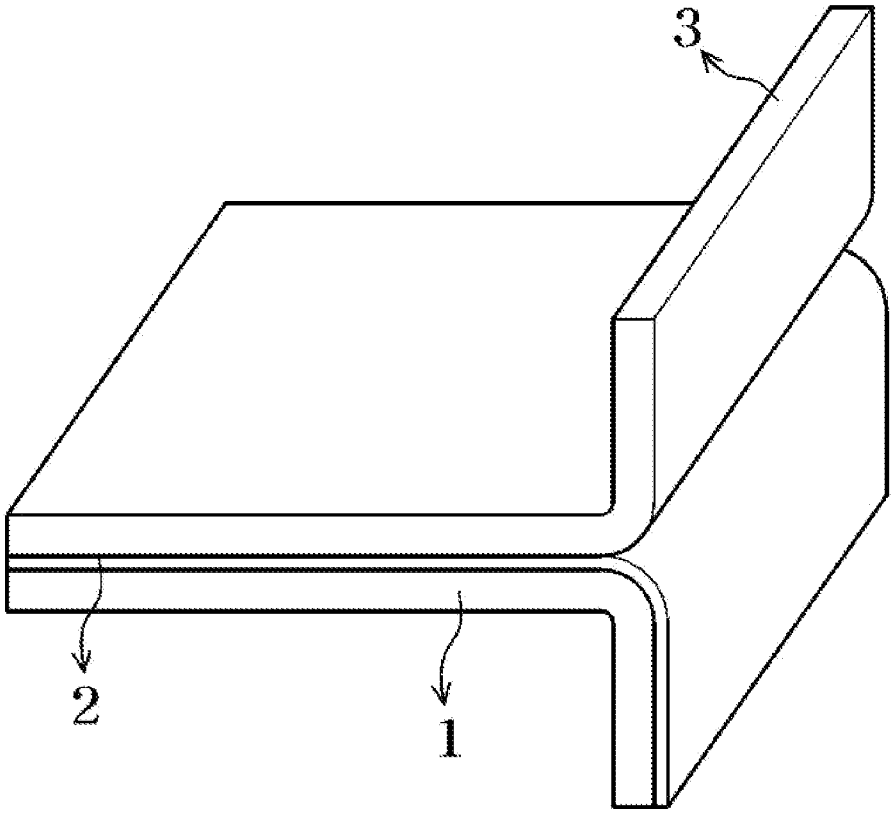
FIG. 1B is a view of the specimen in measurement of T-peel strength.

(1) Initial peel strength (unit: gf/inch): The adhesive film was exposed by removing the release film from each of the adhesive film-containing sheets manufactured in the Examples and Comparative Examples. A polyimide film (GF200, thickness: 50 μm, SKCKOLON) was adhered to the exposed surface of the adhesive film, compressed by a roller under a load of 2 kg, and cut into a specimen having a size of 25 mm×100 mm (width×length). FIG. 1A shows the prepared specimen. Referring to FIG. 1A, a PET film 1, an adhesive film 2, and a polyimide film 3 are sequentially stacked. The specimen was left under conditions of 23±1° C. and 55±5% RH for 30 minutes. Peel strength was measured upon removal of the polyimide film from the adhesive film by a T-peel strength measurement method using a tensile tester (Texture analyzer, TA Industry Co., Ltd.) under conditions of peeling temperature: 25° C., peeling rate: 2,400 mm/min, and peeling angle: 180° in accordance with JISZ2037. T-peel strength may be measured with reference to FIG. 1B. T-peel strength refers to peel strength upon peeling off the polyimide film 3 from the PET film 1 and the adhesive film 2. T-peel strength was measured by pulling the polyimide film 3 in an arrow direction of FIG. 1B, with the PET film 1 and the adhesive film 2 secured to jigs of a TA instrument.

(2) Peel strength after UV irradiation (unit: gf/inch): A specimen was prepared by sequentially stacking a PET film, an adhesive film, and a polyimide film using the same method as in (1). The specimen was irradiated at a PET film side thereof with UV light having a wavelength of 385 nm at a dose of 1,000 mJ/cm$^2$ using a UV LED irradiator (SUV-L5160A, UVSMT Co., Ltd.) and was left under conditions of 23±1° C. and 55±5% RH for 30 minutes. Then, peel strength was measured upon removal of the polyimide film from the adhesive film by a T-peel strength measurement method using a tensile tester (Texture analyzer, TA Industry Co., Ltd.) under conditions of peeling temperature: 25° C., peeling rate: 2,400 mm/min, and peeling angle: 180° in accordance with JISZ2037.

(3) Peel strength after UV irradiation and heat treatment (unit: gf/inch): A specimen was prepared by sequentially stacking a PET film, an adhesive film, and a polyimide film using the same method as in (1). The specimen was irradiated at a PET film side thereof with UV light having a wavelength of 385 nm at a dose of 1,000 mJ/cm$^2$ using a UV LED irradiator (SUV-L5160A, UVSMT Co., Ltd.), held in an oven at 50° C. for 20 minutes, and was then left under conditions of 23±1° C. and 55±5% RH for 30 minutes. Then, peel strength was measured upon removal of the polyimide film from the adhesive film by a T-peel strength measurement method using a tensile tester (Texture analyzer, TA Industry Co., Ltd.) under conditions of peeling temperature: 25° C., peeling rate: 2,400 min/min, and peeling angle: 180° in accordance with JISZ2037.

TABLE 2

| | | Example | | | | | | | Comparative Example | |
|---|---|---|---|---|---|---|---|---|---|---|
| | | 1 | 2 | 3 | 4 | 5 | 6 | 7 | 1 | 2 |
| (Meth)acrylic copolymer | Kind | Preparative Example 1 | Preparative Example 1 | Preparative Example 1 | Preparative Example 1 | Preparative Example 2 | Preparative Example 3 | Preparative Example 1 | Preparative Example 1 | Preparative Example 1 |
| | Content | 100 | 100 | 100 | 100 | 100 | 100 | 100 | 100 | 100 |

TABLE 2-continued

| | | Example | | | | | | | Comparative Example | |
|---|---|---|---|---|---|---|---|---|---|---|
| | | 1 | 2 | 3 | 4 | 5 | 6 | 7 | 1 | 2 |
| Curing agent | Isocyanate-based | 0.5 | 0.5 | 0.5 | 0.5 | 0.5 | 0.5 | 0.5 | 0.5 | 0.5 |
| | Metal chelate-based | 0.3 | 0.3 | 0.3 | 0.3 | 0.3 | 0.3 | 0.3 | 0.3 | 0.3 |
| Mono- or higher functional monomer | Kind | Monomer A | Monomer B | Monomer C | Monomer D | Monomer C | Monomer C | Monomer C | Monomer A | Monomer C |
| | Content | 80 | 80 | 50 | 50 | 50 | 50 | 50 | 80 | 50 |
| Binder having a melting point of 30° C. to 60° C. | Preparative Example 4 | 3 | 3 | 3 | 3 | 3 | 3 | — | — | — |
| | Preparative Example 5 | — | — | — | — | — | — | 3 | — | — |
| Initiator | | 0.5 | 0.5 | 0.5 | 0.5 | 0.5 | 0.5 | 0.5 | 0.5 | 0.5 |
| Curing accelerator | | 0.2 | 0.2 | 0.2 | 0.2 | 0.2 | 0.2 | 0.2 | 0.2 | 0.2 |
| Initial peel strength | | 68 | 57 | 48 | 53 | 51 | 57 | 52 | 77 | 65 |
| Peel strength after UV irradiation | | 230 | 302 | 327 | 345 | 262 | 293 | 334 | 233 | 323 |
| Peel strength after UV irradiation and heat treatment | | 524 | 531 | 721 | 798 | 694 | 705 | 752 | 289 | 354 |
| Equation 1 | | 7.7 | 9.3 | 15.0 | 15.1 | 13.6 | 12.4 | 14.5 | 3.7 | 5.4 |

As shown in Table 2, the adhesive films according to embodiments of the present invention had an initial peel strength of greater than 0 gf/inch to 100 gf/inch. Accordingly, although not shown in Table 2, the adhesive films could be easily removed from the adherend. The adhesive film according to embodiments of the present invention had a peel strength increase rate of 7.0 or more, as calculated by Equation 1. As a result, the adhesive film secured to the adherend could improve adhesive strength and durability of an optical member including the adherend. Accordingly, the adhesive film according to embodiments of the present invention could be concurrently (e.g., simultaneously) used as a temporary protective film for processes with respect to a flexible panel substrate and as a protective film for pattern reinforcement, which is selectively partially removed to form patterns. Further, it could be confirmed that peel strength of the adhesive film according to embodiments of the present invention was remarkably increased after UV irradiation and heat treatment, as compared with peel strength of the adhesive film after UV irradiation.

Accordingly, embodiments of the present invention provide an adhesive film that can be easily removed from an adherend after attachment of the adhesive film thereto and can be secured to the adherend through a process (e.g., a predetermined process). Further, embodiments of the present invention provide an adhesive film that can be adhered at low peel strength to an adherend to provide temporary protection to the adherend in an initial stage and can be easily removed from the adherend without deformation and/or damage to the adherend through selective cutting of an unnecessary portion thereof. Further, embodiments of the present invention provide a protective adhesive film that exhibits significant increase in peel strength after irradiation with light and heat treatment, as compared with peel strength before irradiation with light, and is secured to an adherend to improve durability of an optical member including the adherend. Further, embodiments of the present invention provide an adhesive film that can be concurrently (e.g., simultaneously) used as a temporary protective film for processes with respect to a flexible panel substrate and as a protective film for reinforcement of patterns, which is selectively partially peeled off to form patterns.

Conversely, the adhesive films of the Comparative Examples failing to satisfy the features of the present invention did not have the effects of the present invention.

It should be understood that various modifications, changes, alterations, and equivalent embodiments can be made by those skilled in the art without departing from the spirit and scope of the present invention.

What is claimed is:

1. An adhesive film formed of an adhesive composition comprising a (meth)acrylic copolymer, a curing agent, a mono- or higher functional monomer, a binder having a melting point of about 30° C. to about 60° C., and an initiator, the adhesive film having a peel strength increase rate of 7.0 or more, as calculated by the following Equation 1:

$$\text{Peel strength increase rate}=P2/P1,$$

where P1 is an initial peel strength (unit: gf/inch) of the adhesive film with respect to an adherend, as measured on a specimen of the adhesive film and the adherend, and P2 is a peel strength of the adhesive film (unit: gf/inch) with respect to the adherend, as measured on the specimen of the adhesive film and the adherend after irradiation with light and heat treatment of the specimen, wherein an amount of the binder on an interface between the adhesive film and the adherend after irradiation with light and heat treatment is greater than an amount of the binder on the interface before irradiation with light and heat treatment, and wherein the binder is formed of a monomer mixture comprising 70 mol % to 99 mol % of a first monomer comprising a (meth)acrylate having a linear or branched $C_{16}$ to $C_{22}$ alkyl group at an ester site and 1 mol % to 30 mol % of a second monomer comprising a silicone-free monomer, the silicone-free monomer comprising a (meth)acrylate having a linear or branched alkyl group containing less than ten carbon atoms at an ester site.

2. The adhesive film according to claim 1, wherein P1 is greater than 0 gf/inch and less than or equal to about 100 gf/inch.

3. The adhesive film according to claim 1, wherein P2 is about 500 gf/inch or more.

4. The adhesive film according to claim 1, wherein the mono- or higher functional monomer has a higher glass transition temperature in a homopolymer phase than the (meth)acrylic copolymer.

5. The adhesive film according to claim 1, wherein a difference in glass transition temperature between the mono- or higher functional monomer in a homopolymer phase and the (meth)acrylic copolymer is about 20° C. or more.

6. The adhesive film according to claim 1, wherein the mono- or higher functional monomer has a glass transition temperature of about −30° C. or more in a homopolymer phase.

7. The adhesive film according to claim 1, wherein the mono- or higher functional monomer comprises an aromatic group-containing mono- or higher functional monomer.

8. The adhesive film according to claim 7, wherein the aromatic group-containing mono- or higher functional monomer comprises a compound of the following Formula 1:

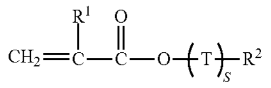

where $R^1$ is hydrogen or a methyl group; s is an integer of 0 to 10; $R^2$ is a substituted or unsubstituted $C_6$ to $C_{50}$ aryl group or a substituted or unsubstituted $C_6$ to $C_{50}$ aryloxy group; and T is a substituted or unsubstituted $C_1$ to $C_6$ alkylene group or a substituted or unsubstituted $C_1$ to $C_6$ alkyleneoxy group.

9. The adhesive film according to claim 1, wherein the mono- or higher functional monomer is present in an amount of about 10 parts by weight to about 200 parts by weight relative to 100 parts by weight of the (meth)acrylic copolymer.

10. The adhesive film according to claim 1, wherein the (meth)acrylic copolymer has a glass transition temperature of about −10° C. or less.

11. The adhesive film according to claim 1, wherein the (meth)acrylic copolymer comprises a copolymer of a monomer mixture comprising an alkyl group-containing (meth) acrylic monomer and a hydroxyl group-containing (meth) acrylic monomer, the hydroxyl group-containing (meth) acrylic monomer being present in an amount of about 0.1 mol % to about 10 mol % in the monomer mixture.

12. The adhesive film according to claim 1, wherein the curing agent comprises a mixture of an isocyanate curing agent and a metal chelate curing agent.

13. The adhesive film according to claim 1, wherein the initiator comprises at least one selected from among a photo-radical initiator and a photo-cationic initiator.

14. The adhesive film according to claim 1, wherein the adhesive composition comprises 100 parts by weight of the (meth)acrylic copolymer, about 0.01 parts by weight to about 8 parts by weight of the curing agent, about 10 parts by weight to about 200 parts by weight of the mono- or higher functional monomer, about 0.1 parts by weight to about 20 parts by weight of the binder, and about 0.01 parts by weight to about 7.5 parts by weight of the initiator.

15. The adhesive film according to claim 1, wherein the monomer mixture of the binder consists of the first monomer and the second monomer.

16. An optical member comprising a flexible panel and an adhesive film stacked on at least one surface of the flexible panel, wherein the adhesive film comprises the adhesive film according to claim 1.

17. The optical member according to claim 16, comprising: the flexible panel comprising a flexible substrate, the adhesive film stacked on a lower surface of the flexible substrate, and a protective film stacked on a lower surface of the adhesive film.

18. An optical display apparatus comprising the adhesive film according to claim 1.

19. An adhesive film formed of an adhesive composition comprising a (meth)acrylic copolymer, a curing agent, a mono- or higher functional monomer, a binder having a melting point of about 30° C. to about 60° C., and an initiator, the adhesive film having an initial peel strength of greater than 0 gf/inch to about 100 gf/inch with respect to an adherend, as measured on a specimen of the adhesive film and the adherend, and a peel strength of 500 gf/inch or more with respect to the adherend, as measured on the specimen of the adhesive film and the adherend after irradiation with light and heat treatment of the specimen, wherein an amount of the binder on an interface between the adhesive film and the adherend after irradiation with light and heat treatment is greater than an amount of the binder on the interface before irradiation with light and heat treatment, and wherein the binder comprises a binder is formed of a monomer mixture comprising 70 mol % to 99 mol % of a first monomer comprising a (meth)acrylate having a linear or branched $C_{16}$ to $C_{22}$ alkyl group at an ester site and 1 mol % to 30 mol % of a second monomer comprising a silicone-free monomer, the silicone-free monomer comprising a (meth)acrylate having a linear or branched alkyl group containing less than ten carbon atoms at an ester site.

* * * * *